(12) United States Patent
Jokinen (10) Patent No.: US 8,107,089 B2
(45) Date of Patent: Jan. 31, 2012

(54) METHOD AND MEASURING DEVICE FOR MEASURING TRANSLATION OF SURFACE

(75) Inventor: Hannu Jokinen, Oulunsalo (FI)

(73) Assignee: Visicamet Oy, Oulunsalo (FI)

( * ) Notice: Subject to any disclaimer, the term of this patent is extended or adjusted under 35 U.S.C. 154(b) by 634 days.

(21) Appl. No.: 12/223,323

(22) PCT Filed: Jan. 30, 2007

(86) PCT No.: PCT/FI2007/050049
§ 371 (c)(1),
(2), (4) Date: Aug. 20, 2008

(87) PCT Pub. No.: WO2007/085704
PCT Pub. Date: Aug. 2, 2007

(65) Prior Publication Data
US 2010/0225931 A1    Sep. 9, 2010

(30) Foreign Application Priority Data
Jan. 30, 2006    (FI) ..................................... 20065063

(51) Int. Cl.
*G01B 11/14*    (2006.01)
(52) U.S. Cl. .......................... 356/623; 356/624; 356/625
(58) Field of Classification Search .......... 356/600–640, 356/239.3; 250/561, 548, 557; 348/587, 348/592, 239; 378/21, 58, 205
See application file for complete search history.

(56) References Cited

U.S. PATENT DOCUMENTS

| | | | |
|---|---|---|---|
| 3,508,066 A | 4/1970 | Oliver | |
| 4,162,509 A | 7/1979 | Robertson | |
| 4,580,894 A | 4/1986 | Wojcik | |
| 4,922,337 A * | 5/1990 | Hunt et al. | ...................... 348/88 |
| 5,149,980 A * | 9/1992 | Ertel et al. | ............... 250/559.32 |
| 5,594,768 A * | 1/1997 | Fujii et al. | ........................ 378/21 |
| 5,731,849 A * | 3/1998 | Kondo et al. | .................. 348/699 |
| 6,104,438 A * | 8/2000 | Saito | ............................. 348/587 |
| 6,714,732 B2 * | 3/2004 | Kanemitsu | .................... 396/104 |
| 7,476,025 B2 * | 1/2009 | Pohan et al. | .................. 378/205 |
| 2005/0049817 A1 | 3/2005 | Kobayashi | |

FOREIGN PATENT DOCUMENTS

| | | |
|---|---|---|
| EP | 0 448 615 B1 | 3/1994 |
| FI | 80527 B | 6/1990 |
| JP | 7-063552 A | 3/1995 |
| JP | 8-055887 A | 2/1996 |
| JP | 2004-117010 A | 4/2004 |
| JP | 2005-99012 A | 4/2005 |
| WO | WO-98/53327 A1 | 11/1998 |

* cited by examiner

*Primary Examiner* — Sang Nguyen
(74) *Attorney, Agent, or Firm* — Birch, Stewart, Kolasch & Birch, LLP (57) ABSTRACT

A surface (104) is detected repeatedly be a detector row (102) of at least one detector (100), the direction of the detector row (102) being the same as the surface's (104) primary direction of movement, and simultaneously a distance between the surface (104) and the detector (100) is detected to produce enlargement data and response rows. Successive response rows are arranged into a response matrix, and the direction of at least one curve in the matrix is determined. Translation of the surface (104) is determined in response matrices formed by means of the direction or directions of at least one curve or curve portion on the basis of enlargement data.

22 Claims, 10 Drawing Sheets

METHOD AND MEASURING DEVICE FOR MEASURING TRANSLATION OF SURFACE

FIELD

The invention relates to a method and a measuring device for measuring translation of a surface.

BACKGROUND

A correlation value of two images may be used for detecting movement, rising, falling, inclination, changes in form and immovability of a surface. If the images are similar, the surface has remained unchanged and the correlation value is high. If, on the other hand, there are differences between the images, the surface has changed in some way, which decreases the correlation value. Searching for the maximum value of correlation by moving the images to be compared with respect to each other in time or in terms of location may provide information on the movement of the surface to be measured.

The movement velocity of a surface may also be measured by creating image rows of the moving surface in the direction of movement and by arranging the image rows into an image matrix. The angular coefficient of the lines in the matrix may be used for determining the surface velocity. Such a solution is described in Finnish Patent 80527.

However, the prior art solutions involve problems. Correlation requires that comparable images exist on the surface to be measured. In addition to the use of correlation and various velocity measurements, it is difficult or impossible to measure a (nearly) immovable surface, a surface that moves back and forth, or a surface that moves irregularly because the surface movement does not always have a velocity that can be determined unambiguously.

BRIEF DESCRIPTION

The object of the invention is to provide an improved method and a measuring device implementing the method. This is achieved by a method of measuring translation of a surface wherein the movement of the object to be measured has at least one primary direction of movement. The method further comprises detecting the surface repeatedly by a detector row of at least one detector, the direction of the detector row being the same as the primary direction of movement of the surface, and simultaneously detecting a distance between the surface and the detector to produce enlargement data and response rows; arranging successive response rows into a response matrix; determining the direction of at least one curve in each response matrix; and determining the surface translation in response matrices formed by means of the direction or directions of at least one curve or curve portion on the basis of enlargement data.

The invention also relates to a measuring device for measuring translation of a surface. The measuring device comprises at least one detector including a detector row; a detector for measuring a distance between the surface and the detector for determining enlargement data; and a signal processing unit; and for forming response rows, each detector row is arranged to detect the surface of an object to be measured continuously, the surface having at least one primary direction of movement, and the direction of each detector row is set to be the same as the surface's primary direction of movement; the signal processing unit is arranged to receive distance information and response rows formed by each detector row and form a response matrix of successive response rows related to each detector row and determine the direction of at least one curve in each response matrix; and the signal processing unit is arranged to determine the surface translation in response matrices formed by means of the direction or directions of at least one curve or curve portion on the basis of enlargement data.

Preferred embodiments of the invention are disclosed in the dependent claims.

The method and measuring device according to the invention provide several advantages. The quality of the surface to be measured hardly limits the measurement at all. Furthermore, it is not necessary to expect the surface movement to be continuous or regular, and the surface may also be immovable by default.

LIST OF FIGURES

The invention will now be described in greater detail by means of preferred embodiments with reference to the accompanying drawings, in which.

DESCRIPTION OF EMBODIMENTS

The present solution is applicable to measuring a patterned surface, which may be a wood surface, paper surface, metal surface, road surface, fabric surface or another similar surface whose detected signal responses vary when a suitable enlargement is used. The patterned surface may refer to a surface whose response varies according to the parameter to be detected. The parameter may be intensity, wavelength, a combination of these or another property which is detected on the surface at the wavelength used and whose response values may be arranged into response rows, which may further be arranged into matrices. In the response matrices thus formed, the response variations in the patterns may be detected as curves, which may also be called lines. The curve widths and their mutual distances may vary according to the surface to be measured. The directions of the curves are relevant to measurement. Applications may include quality control of semiconductor discs, paper and/or board, metal strips and/or sheets or the like without limiting the invention to these.

Figure 1A:
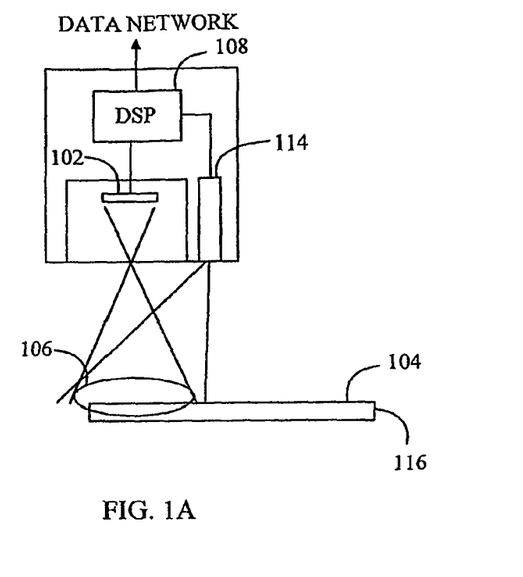
FIG. 1A illustrates a system chart of a measuring apparatus.

FIG. 1A illustrates an example of a system chart of a measuring apparatus. A measuring device may comprise a detector 100, which includes a row or matrix 102 comprising detective elements, a signal processing unit 108 and possibly a radiation source 114. The detector 100 may be, for example, a camera, which may be included in a mobile phone, for instance. If a radiation source 114 is available and it is used, it may illuminate the surface 104 of the object 116 to be measured so that the band-like detection area 106 is totally illuminated. Deviating from FIG. 1A, the object 116 to be measured may also be between the detector 100 and the radiation source 114, in which case the radiation emitted by the radiation source 114 penetrates the object to be measured. The radiation source 114 may emit electromagnetic radiation, such as gamma radiation, x-ray radiation, optical radiation or radio frequency radiation, acoustic radiation, such as ultrasound, or particle radiation. The detector row 102 detects the detection area 106 and feeds an electric signal corresponding to the detection into the signal processing unit 108 for generation of measurement data. The signal processing unit 108 may control the operation of the detector 100 and the radiation source 114. Furthermore, the measuring device may communicate with external devices via a data network, for instance. The measuring device may utilize a public electricity network or a battery as its power source.

Figure 1B:
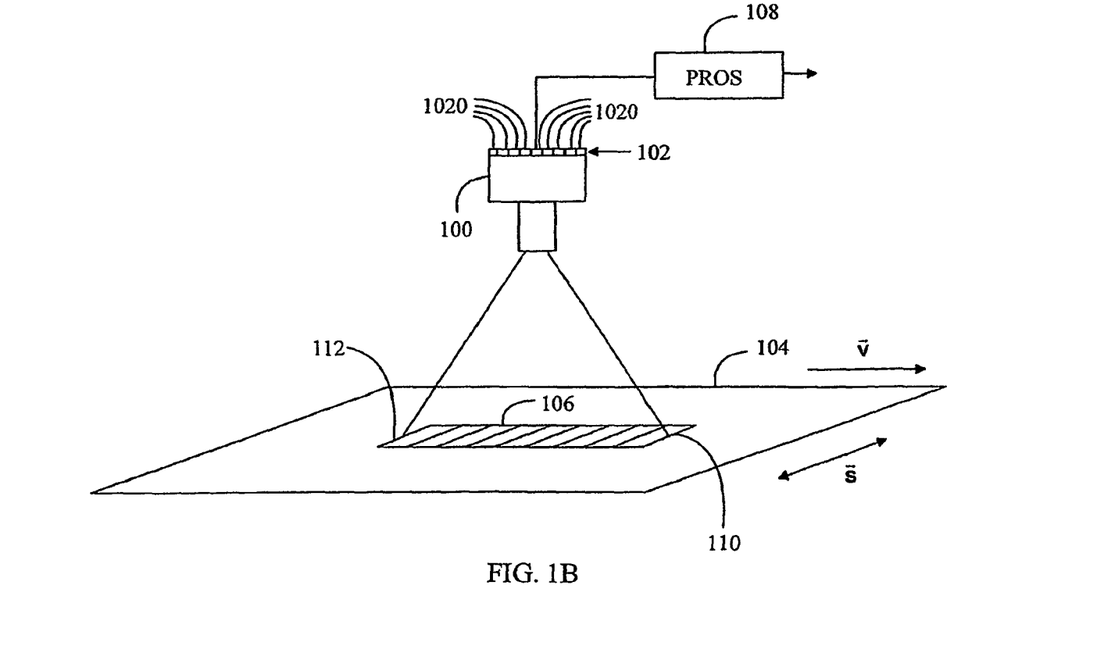
FIG. 1B illustrates a block diagram of a measuring apparatus.

A measuring solution in accordance with the above will now be described with reference to FIG. 1B. In the solution, the detector 100, for example, produces an image of the surface 104 in the detector row 102 in the detector 100. Instead of imaging optics, non-imaging optics may also be employed. A sequence of imaging areas of the detectors of the detector row 102 produces a band-like detection area 106 on the surface 104. The imaging area may also be called a detected area, but in this example we will use the term 'imaging area'. The detector row 102 comprises at least two detector elements, i.e. pixels 1020. Commercial row detectors may include from a few detector elements to thousands of detector elements in a row, and when adjacent rows are employed, the number of elements may increase to several millions of elements. In the detector row 102, the surface 104 may be imaged or, more generally, detected successively at a desired frequency, which may be adjusted to the primary movement of the surface or surface translations. To detect some phenomena, it is sufficient to take an image once a day or month. The highest imaging frequencies are restricted by the operation of the detectors, but a frequency of approximately 100 kHz may be used with a row detector of 1000 pixels. Instead of a mere row detector, it is also feasible to use a matrix detector, in which case one or more pixel rows of the matrix detector may function as the row detector. A matrix detector may be used in determining inclination between the detector and the surface to be measured in a cross direction to the detected row by using crossing detecting rows (see FIGS. 4A and 4B).

The surface's 104 primary direction of movement is illustrated by an arrow. The surface's primary movement refers to the unambiguous movement the surface makes continuously. The translation of an object moving in the direction of the primary movement and the translation measured otherwise in parallel with the primary movement but along the surface are equal if the surface portion in question is parallel with the primary movement. The surface translation refers to a movement or slight motion $\vec{s}$ deviating from the primary movement of the object. Such movements include the surface moving towards or away from a detector row, inclination of the surface with respect to a detector row (or vice versa), local transformations and/or a slight motion of the surface of a stationary object.

This measuring arrangement may be used for determining the surface velocity in the direction of the surface plane in a prior art manner, which is performed as follows. By collecting at least two successive image rows of the detector row 102 into the memory of the signal processing unit 108 or general response rows, the response rows may be arranged into a response matrix. In the response matrix, dots whose intensity or another property deviates from the environment form line-like curves whose direction is dependent on the surface movement. Location and time axes may be selected according to the measuring geometry, in which case the angular coefficient describing the direction of each curve may be measured by convoluting the response matrix to obtain gradients parallel with the location axis and the time axis, for instance. In that case, the angular coefficient is obtained as a relation between these gradients, and velocity or a value proportional to it may be determined for each dot in the response matrix. The measuring accuracy may further be improved by averaging the velocity values of each response row. The selection of the values to be included in the average value may be controlled by taking only the values whose square sum exceeds a predetermined value into the values to be summed up. This way, only the dots in the response matrix that are included in one of the response matrix lines are taken into the values to be averaged. Solution of this kind is described in greater detail in Finnish patent 80527.

Another prior art solution involves detecting a moving surface at two points and determining the time the surface needs for a translation between the measuring points on the basis of correlation. Instead of time, the surface velocity may be determined. The measurement may be performed by correlating detector element signals directly or by correlating the frequency response of detector elements, which is dependent on the structure of the surface 104 and/or whether it is patterned or not. Measurement arrangement of this kind may be implemented in accordance with FIG. 1A, in which case correlation may be formed between response signals of two detector elements or a group of two desired detector elements. Enlargement data employed simultaneously in the measurement of surface translation may be determined by measuring the distance between the detector and the surface to be detected as accurately and comprehensively as possible in the area to be detected.

Figure 1C:
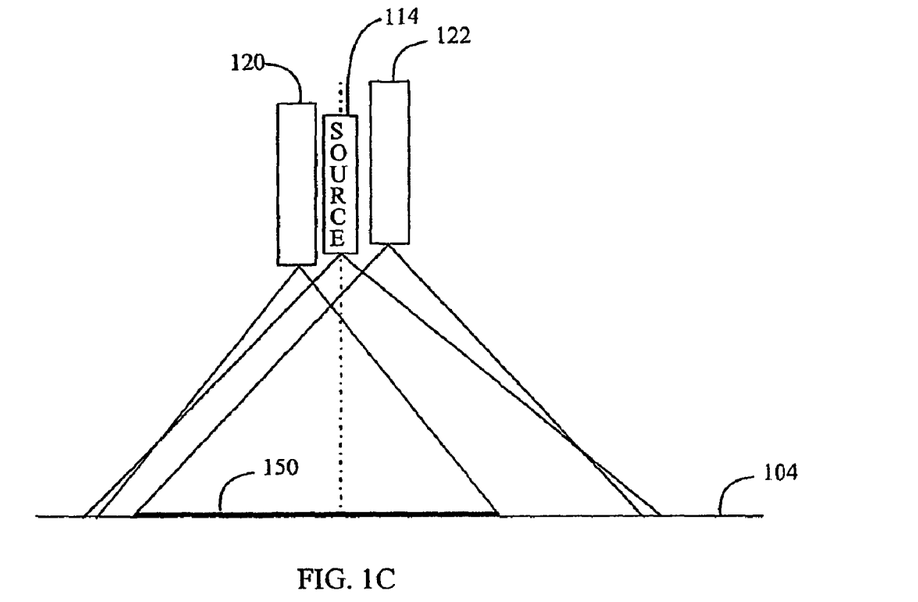
FIG. 1C illustrates use of two detectors in a measuring device.

In FIG. 1C, the enlargement data are determined by means of two detectors. FIG. 1C illustrates a solution employing two detectors (e.g. cameras) 120, 122 which detect the surface 104 to be measured at two different enlargements and may be substantially similar to the detector 100. The detector rows and their optics may be placed so that they have a common optical plane in the primary direction of movement. Thickened line 150 illustrates a line-like area both detectors detect together.

Enlargement M may be determined by relation L/F, where L is the distance of the object to be measured from the detector and F is the focal length of the optics. Different enlargements may be implemented by the following arrangements, for instance. Distances L1 and L2 are different and/or focal lengths F1 and F2 are different. One of the optics may also be telecentric. Different enlargements may also be implemented by dividing an optical signal entering through one of the optics by a beam splitter, for example, (not shown in FIG. 1C) into two detector rows at different distances. The use of two enlargements also focuses the measurement of the translation of the front and the rear edge when the edge moves from one pixel to another (see FIGS. 7A to 8B). The focusing is based on the distance and the use of the signal response of one or more detectors. The enlargement data may also be determined by means of separate distance measurement, in which case detector 122, for example, may determine the distance.

Figure 1D:
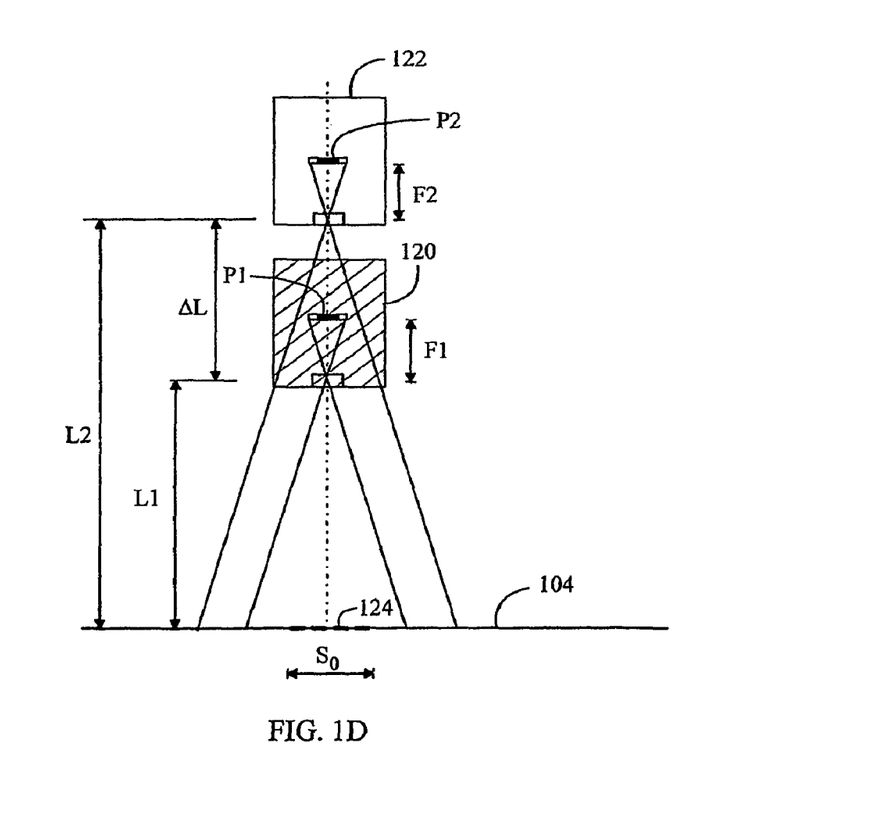
FIG. 1D illustrates measures related to the use of two detectors.

FIG. 1D illustrates different measures of the described solution. The focal length of detector 120 is F1 and the focal length of detector 122 is F2. The distance of detector 120 from the surface 104 to be measured is L1 and the distance of detector 122 from the surface 104 to be measured is L2. The pixel size of the image of object S0 formed on the detector 120 is P1 and the pixel size of the image of object S0 formed on the detector 122 is P2. For the sake of simplicity, the pixel size of both detectors 120, 122 may be determined to be the same, i.e. PL. The size of a certain object to be measured is S0 and the distance between the detectors ΔL. The enlargement M1 of the detector 120 will be M1=L1/F1 and the enlargement of the detector 122 M2=L2/F2. The following holds true for distance L2: L2=L1+ΔL. Since S0=P1*M1*PL=P2*M2*PL, the following formula may be derived:

$$L1 = [P2 * \Delta L * P1] / [P1 * F2 - P2 * F1] \quad (1)$$

Since other factors than the image sizes P1 and P2 of the object are constants in formula (1), the image sizes P1 and P2 of the objects in the image may be determined by determining the distance of the surface 104 to be measured and/or variation in the distance during the measurement. The variation in the distance often means variation in the height or shape of the surface 104 of the object to be measured. Use of two similar detectors measuring at least partly the same detection area provides the measurement of the object and surface translation and velocity with accuracy and redundancy. This measurement differs from conventional measurement in that the measurement is not performed by means of only one dot but by means of the whole row matrix. Furthermore, two different detectors may be used for self-diagnosis in the measurement of translation and velocity so that translation and velocity may be measured separately by both detectors and the results may be compared to each other. If the results differ from each other too much, the section of the measuring device related to either detector is deficient.

Figure 2A:
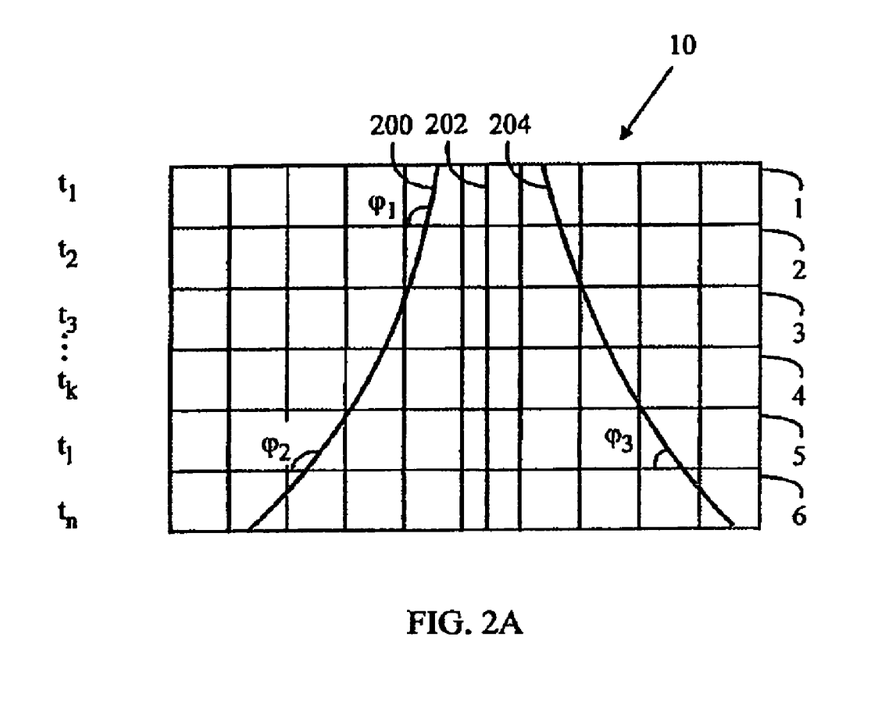
FIG. 2A illustrates an image matrix when the surface approaches the detector.

In the situation according to FIG. 2A, the surface 104 approaches the detector row 102. The response matrix 10 is formed by arranging a number of response rows 1 to 6 in parallel. Successive moments of time $t_1$ to $t_n$ representing the measuring principle and some detecting elements included in the row are illustrated in the response matrix 10. Since the surface 104 approaches the detector row, the curves 200 to 204 of the response matrix 10 seem to be diverging from one another. Even though in reality the curves are visible with the accuracy of the detecting elements, in this example the curves have been drawn so as to illustrate the measuring principle better. The curve direction may be measured by determining the angle φ or angular coefficient kk of the curve, which are mutually dependent tan(φ)=kk, where tan( ) refers to a trigonometric tangential function. It may be thought that there is a dependency between the angular coefficient kk of the curve and the velocity v of the object to be measured v=k*kk, where k is a constant and k may be determined by calculations or experiments. The constant k is dependent on the enlargement used in the measurement, for example. In general, the constant k is scaled in accordance with the enlargement coefficient M, i.e. the enlargement data obtained through measurement is used as a scaling coefficient between the measured surface translation and the translation calculated in the direction of the primary movement. The information on the angle thus corresponds to calculated measurement information. By measuring the change in the direction of at least one curve $\Delta\phi=\phi_2-\phi_1$, the translation between the detector row 102 and the surface 104 may be determined. The translation may be determined as velocity having translation between 104. The translation may be determined as velocity at which the detector row 102 and the surface 104 approach each other. Alternatively or additionally, directions $\phi_2$ and ($\phi_3$ of at least two curves may be determined and compared to each other in order to determine the direction change $\Delta\phi=\phi_2-\phi_3$ and the translation between the detector row 102 and the surface 104.

Figure 2B:
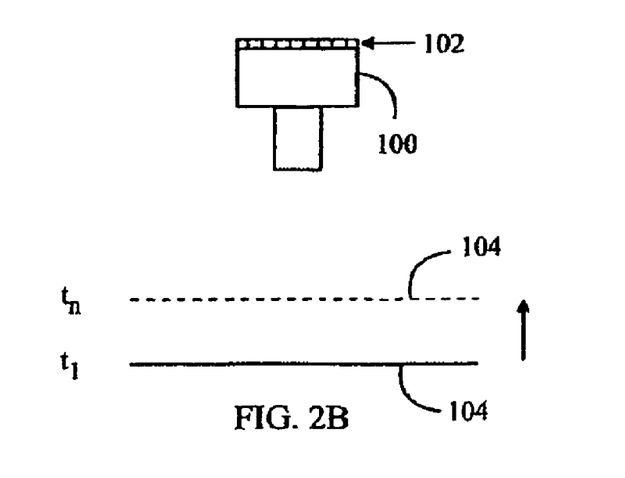
FIG. 2B illustrates surface movement towards the detector.

FIG. 2B illustrates a change in the measuring geometry according to FIG. 2A. At moment $t_1$, the surface 104 to be measured is at a distance illustrated by a continuous line from the detector row 102 of the detector 100, and at moment $t_4$, the surface 104 is at a distance illustrated by a broken line from the detector row 102 of the detector 100. The arrow illustrates the direction of translation.

Figure 3A:
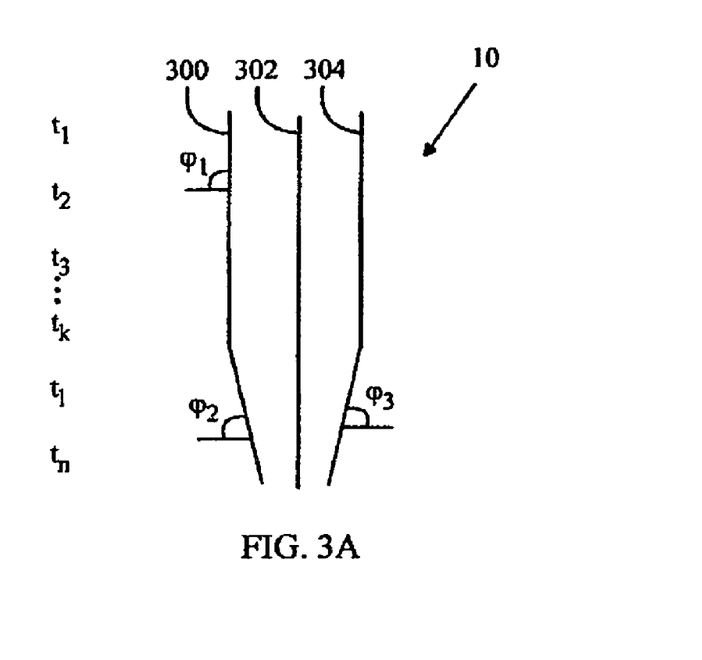
FIG. 3A illustrates an image matrix when the surface moves away from the detector.

In the situation according to FIG. 3A, the surface 104 moves away from the detector row 102, but otherwise the illustration corresponds to the situation in FIG. 2A, even though elements of the response matrix are not shown in this Figure. In that case, curves 200 to 204 of the response matrix 10 seem to be approaching each other. As in the case illustrated in FIG. 2A, the translation between the detector row 102 and the surface 104 may be determined by measuring a change in the direction of at least one curve $\Delta\phi=\phi_2-\phi_1$. The translation may be determined as the velocity at which the detector row 102 and the surface 104 move away from each other. Alternatively or additionally, directions $\phi_2$ and $\phi_3$ of at least two curves may be determined and compared to each other in order to determine the direction change $\Delta\phi=\phi_2-\phi_3$ and the translation between the detector row 102 and the surface 104. In the cases of FIGS. 2A and 3A, the velocity in the direction of the surface 104 normal may be measured. For example, the average of the curve angles could be used for measuring the primary velocity of the surface 104 in the direction of the surface plane. In these examples, the surface 104 is stationary and does not primarily move in the surface 104 plane.

Figure 3B:
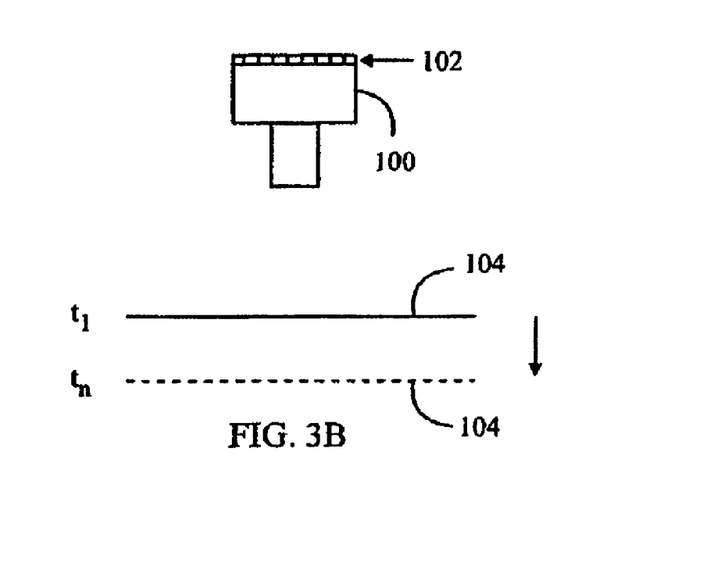
FIG. 3B illustrates surface movement away from the detector.

FIG. 3B illustrates a change in the measuring geometry according to FIG. 3A. At moment $t_1$, the surface 104 to be measured is at a distance illustrated by a continuous line from the detector row 102 of the detector 100, and at moment $t_4$, the surface 104 is at a distance illustrated by a broken line from the detector row 102 of the detector 100. The arrow illustrates the direction of translation.

Figure 4A:
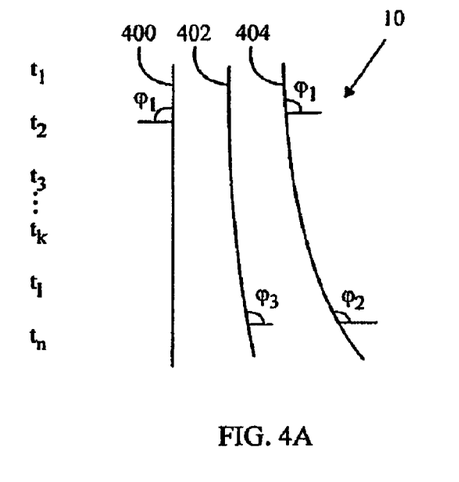
FIG. 4A illustrates an image matrix when the surface and the detector incline towards each other.

FIG. 4A illustrates a response matrix 10 of a surface where the end 110 of the image area 106 is closer to the detector row 102 than the beginning 112 of the image area, i.e. the direction of the detector row 102 and the normal of the surface 104 to be measured are not at a perpendicular angle with respect to each other. The illustration in FIG. 4A corresponds to the situation in FIG. 2A, even though elements of the response matrix are not shown in this figure. In the situation of FIG. 4A, the curves move away from each other. In the case of a contrary inclination, the curves would approach each other. As in the case illustrated in FIGS. 2A and 3A, the translation between the detector row 102 and the surface 104 may be determined by measuring a change in the direction of at least one curve $\Delta\phi=\phi_2-\phi_1$. The translation may be determined as the inclination angle α at which the detector row 102 and the surface 104 are with respect to each other. Alternatively or additionally, directions $\phi_2$ and $\phi_3$ of at least two curves may be determined and compared to each other in order to determine the direction change $\Delta\phi=\phi_2-\phi_3$ and the translation between the detector row 102 and the surface 104. In the case of FIG. 4A, the inclination angle α is growing.

Figure 4B:
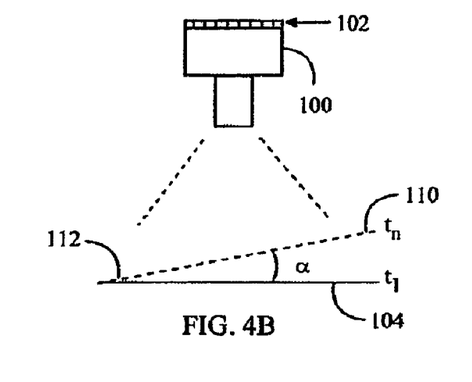
FIG. 4B illustrates surface inclination at angle $\alpha$.

FIG. 4B illustrates translation according to FIG. 4A. The surface 104 to be measured at moment $t_1$ is in the position marked with a continuous line with respect to the detector row 102 of the detector 100, and at moment $t_n$, the surface 104 is in the position marked with the broken line with respect to the detector row 102 of the detector 100.

FIGS. 2A to 4B illustrate measuring the movement between the surface 104 and the detector row 102 or a change in the distance.

Figure 5A:
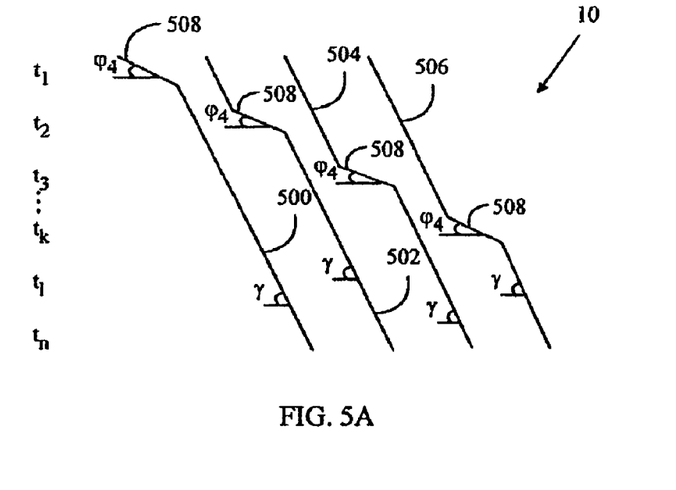
FIG. 5A illustrates an image matrix when there is a moving dent in the surface.
Figure 5B:
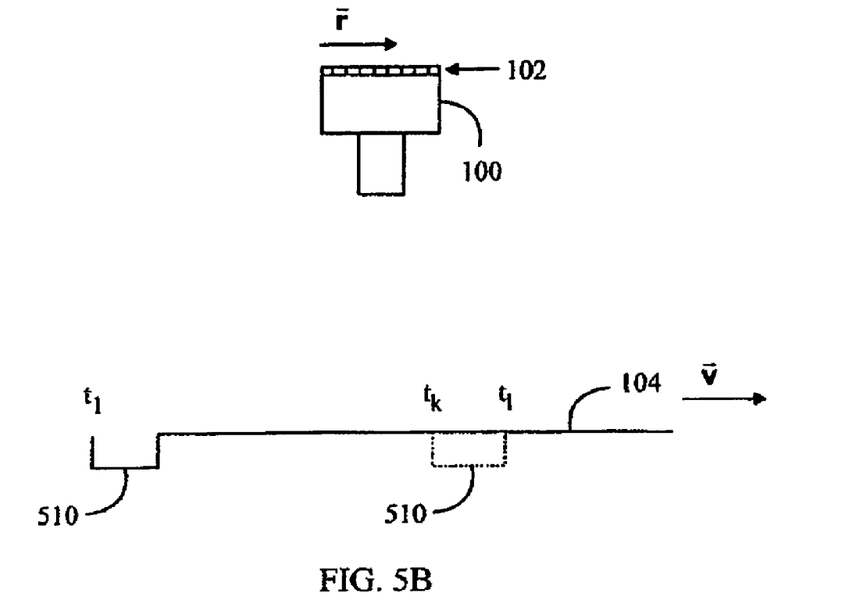
FIG. 5B illustrates movement of the dent.

FIGS. 5A and 5B illustrate measurement of the surface profile. In this example, a translation 510 similar to a dent in the surface 104 is measured. Instead of a dent, this could also be a protrusion. The illustration in FIG. 5A corresponds to the situation in FIG. 2A, even though the response matrix elements are not shown in this figure. In successive images of the response matrix 10 from moment $t_1$ to moment $t_n$, the distortion 508 of the curves 500 to 506 caused by the dent has moved in the row images with the primary movement of the surface 104. The primary velocity of the surface 104 can be measured on the basis of the distance the dent has moved and the time used for moving this distance. The primary velocity of the surface may also be determined from the direction of the curves, which is illustrated by angle γ. The magnitude of the translation 510 may be determined by means of the direction of the distortion 508 caused by the dent, which is illustrated by angle $\phi_4$. The direction indicated by angle $\phi_4$ may be compared to the direction of the angle γ indicating the surface velocity, for example. A change $\Delta\phi=\gamma-\phi_4$ may be determined from this to express, for example, how much further the dent bottom is from the detector row 102 than the rest of the surface 104, i.e. the dent depth may be determined. Measurement of the surface profile may be utilized in measuring the evenness of the surface to be measured or the flatness of a sheet-like object.

FIGS. 5A and 5B relate to a change in the distance between the surface 104 and the detector row 102.

In FIG. 5B, the primary velocity of the surface and its direction, i.e. its speed, is denoted by vector $\vec{V}$. For the measurement, it is often necessary to set the direction $\vec{F}$ of the detector rows 102 to be parallel with the primary speed $\vec{V}$ of the surface.

The change describing translation may also be measured by using two or more different enlargements in imaging (see FIGS. 1C and 1D). Due to different enlargements, the directions of each measured curve or curve portion are different in compiled images produced in the same conditions, i.e. in the response matrices the directions of each measured curve or curve portion are different. The number of measured curves may vary from one to several. Thus a compiled image produced using one enlargement may be employed as a reference for a compiled image produced using another enlargement.

One of the imaging optics may be telecentric imaging optics, in which case distance changes do not cause changes in line directions but the curves illustrated in FIGS. 2A, 3A, 4A and 5A are seen as straights when telecentric optics is used. The reason for this is that there is no perspective when telecentric optics is used in imaging. Thus the curves of FIG. 2A are parallel with straight 202, the curves of FIG. 3A are parallel with curve 302, the curves of FIG. 4A are parallel with curve 400, and the curves of FIG. 5A are at angle γ at all moments $t_1$ to $t_n$ when telecentric optics is used in imaging. The straights formed by telecentric optics may be used as a reference so that the direction of a curve imaged with non-telecentric optics is compared to the direction of a curve imaged with telecentric optics. In that case, the difference between the curve directions is proportional to the surface translation.

Figure 6:
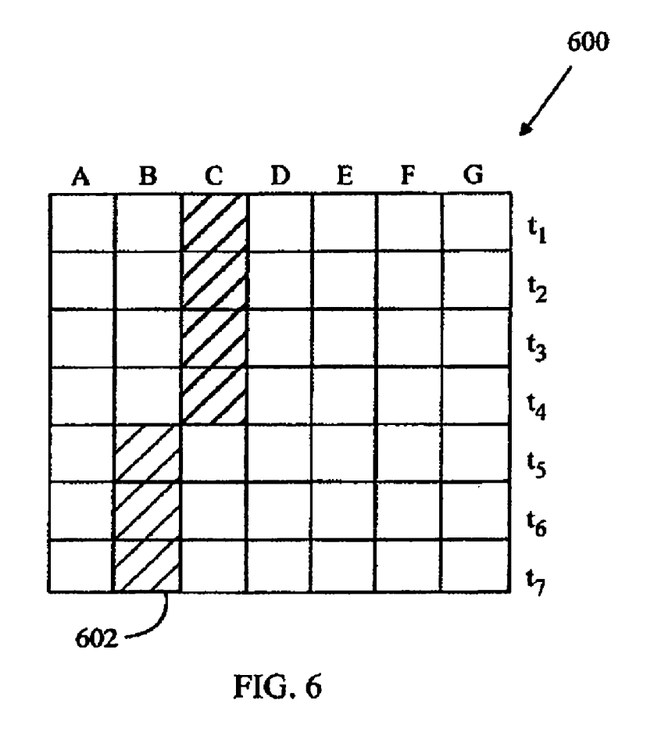
FIG. 6 illustrates an image matrix of a surface which moves slightly in the lateral direction.

FIG. 6 illustrates measurement of "zero velocity". Deviating from other examples, in this embodiment the direction of the surface's primary movement corresponds to the direction of translation. A simple response matrix 600 according to this example comprises 7×7 detector elements. A curve having the shape of a straight can be seen in rows $t_1$ to $t_4$ in element C. This means that there was no translation in the measured surface when these rows were measured. In rows $t_5$ to $t_7$, a line-like curve can be seen in element B. This means that the object of the surface causing a line-like curve has moved a distance corresponding to the width of one pixel to the left or right, depending on the imaging optics, which can be seen as a change in the direction and location between the pixels at moments $t_4$ and $t_5$. In a general case, a surface 104 translation exceeding a predetermined threshold value in the direction of the surface level may be set as a condition for an additional measure. If the predetermined value is 0 pixels, the curve 602 must remain completely straight. In the case of FIG. 6, the translation is one pixel, and thus the additional measure is performed. The additional measure may be an alarm of the fact that the product quality may decrease due to a translation, or a corrective movement of translation to eliminate the translation, for example.

Sometimes small translations are allowed but large ones are not. In that case, the predetermined threshold value for the translation may be, for example, 2 pixels between 5 or 50 successive moments. In the case of FIG. 6, the translation would be smaller than the predetermined threshold value and no additional measures are performed.

Since translations having the magnitude of a pixel(s) are usually very small, the measuring device may be regarded as an accurate translation meter. Thus it may be used in monitoring whether the surface to be measured remains stationary or whether it moves slowly. If the translation is continuous, it may also be used for determining the surface velocity.

When a movement which is slow or very slow with respect to the detector's operating velocity is concerned, response matrix rows may be deleted. Thus the response matrix may be compressed, in which case the lines caused by slow phenomena start to deviate more and more from the line (vertical direction) produced by a stationary object.

Figure 7A:
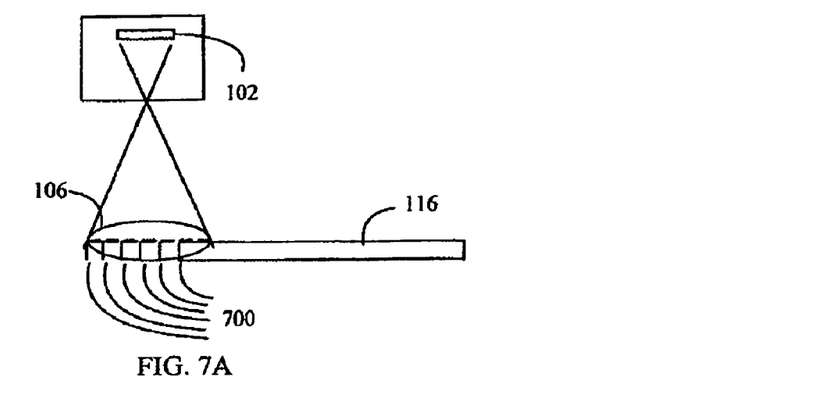
FIG. 7A illustrates movement of the front edge of an object to be measured past a detector row.

Measurement of an object edge will now be described with reference to FIGS. 7A to 8B. The figures illustrate a matrix of 7×9 pixels where the line denotes a detected object to be measured. The pixels on which the background is focused are not shown. FIG. 7A illustrates a situation where the leading edge 700 of the object 116 to be measured enters the detecting area 106 and the leading edge 700 has propagated further into the detecting area 106 at each imaging moment.

Figure 7B:
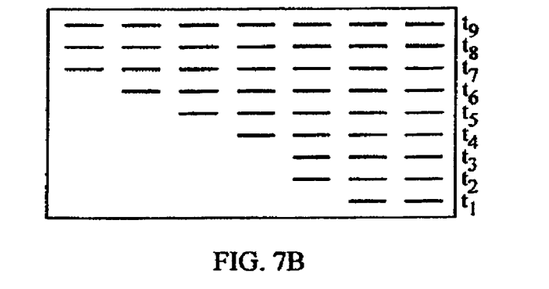
FIG. 7B illustrates a matrix when the front edge of an object to be measured moves past a detector row.

FIG. 7B illustrates a matrix corresponding to the matrix in FIG. 7A, which has been produced of imaged rows. Even though in reality the number of matrix pixels could be thousands or even millions, the number of matrix pixels in the figure is small for the sake of illustration and simplicity. At moment $t_1$, the object to be measured is imaged onto two pixels. At moment $t_2$, the object to be measured is imaged onto three pixels. At moment $t_3$, the object to be measured is further imaged onto three pixels. At moment $t_4$, the object to be measured is imaged onto four pixels and, in that case, the front edge of the object to be measured is in the middle of the measuring row. At moment $t_5$, the object to be measured is imaged onto five pixels. At moment $t_6$, the object to be measured is imaged onto six pixels. At moment $t_7$, the object to be measured is imaged onto seven pixels. At moment $t_8$, the object to be measured is imaged onto all seven pixels. At moment $t_9$, the object to be measured is imaged onto all seven pixels.

Vertical lines may be visible in the matrix pixels onto which the object 116 to be measured is not imaged at a given moment. These lines may be determined as completely stationary by the signal processing unit 108. Even though diagonal lines, which mean a movement, existed in the pixels imaging the surface 104 of the object 116 to be measured, the matrix area would provide as an average a value indicating a velocity much slower than the real velocity of the object to be measured. The edge 700 of the object 116 to be measured can thus be observed and detected when a sudden change is noticed in the movement of the object 116 to be measured. Furthermore, the movement of the object 116 to be measured can be measured after the object 116 to be measured has been detected in the whole detecting area 106 and thus in the whole pixel row, i.e. starting from moment $t_7$ in accordance with the example of FIG. 7B.

Figure 8A:
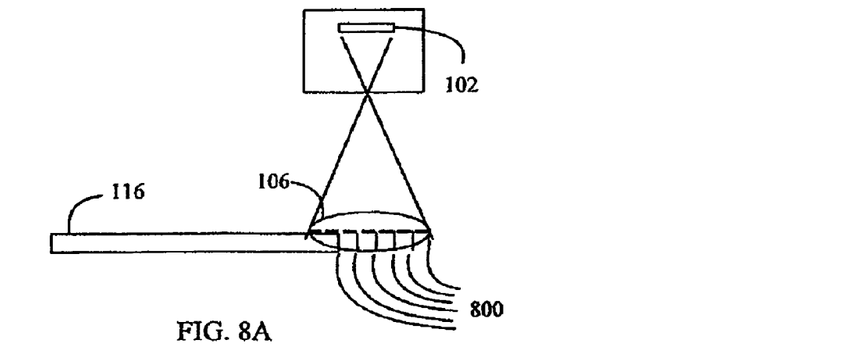
FIG. 8A illustrates movement of the rear edge of an object to be measured past a detector row.

FIG. 8A illustrates a situation where the rear edge 700 of the object 116 to be measured enters the detecting area 106 and the rear edge 800 has propagated further into the detecting area 106 at each imaging moment.

Figure 8B:
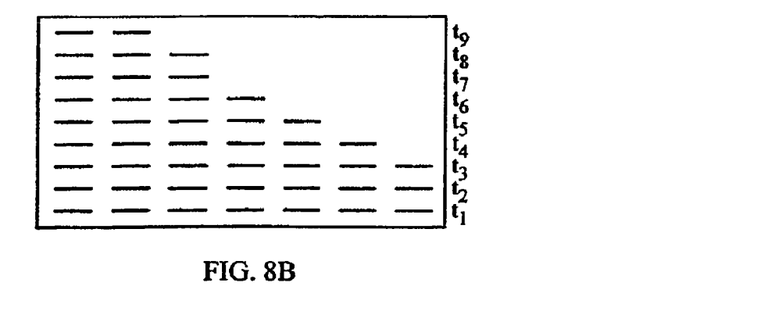
FIG. 8B illustrates a matrix when the rear edge of an object to be measured moves past a detector row.

FIG. 8B illustrates a matrix corresponding to FIG. 8A which has been formed of imaged rows. At moment $t_1$, the object to be measured is imaged onto all pixels. At moment $t_2$, the object to be measured is imaged onto all pixels. At moment $t_3$, the object to be measured is imaged onto six pixels. At moment $t_4$, the object to be measured is imaged onto five pixels. At moment $t_5$, the object to be measured is further imaged onto five pixels. At moment $t_6$, the object to be measured is imaged onto four pixels and the front edge of the object to be measured is in the middle of the measuring row. At moment $t_7$, the object to be measured is imaged onto three pixels. At moment $t_8$, the object to be measured is imaged onto three pixels. At moment $t_9$, the object to be measured is imaged onto two pixels.

As in the case of the front edge, vertical lines may be visible in the matrix pixels onto which the object 116 to be measured is not imaged at a given moment, and the signal processing unit 108 determines these lines as completely stationary. Even though diagonal lines, which mean a movement, existed in the pixels imaging the surface 104 of the object 116 to be measured, the matrix area provides as an average a value indicating a velocity much slower than the real velocity of the object to be measured. The edge 700 of the object 116 to be measured can thus be observed and detected when a sudden change is noticed in the movement of the object 116 to be measured. Furthermore, the movement of the object 116 to be measured can be measured after the object 116 to be measured has been detected in the whole detecting area 106 and thus in the whole pixel row, i.e. starting from moment $t_6$ in accordance with the example of FIG. 7B.

Since the front and rear edges can be detected by the same measuring device as the movement of the object 116, no separate sensors are needed to detect the edges of the object to be measured, which simplifies the measuring device.

Figure 9A:
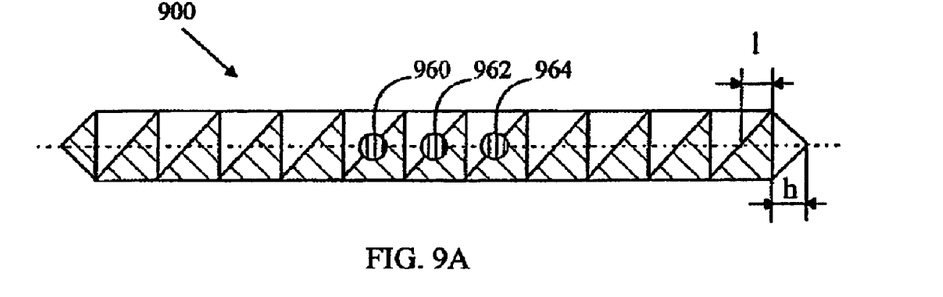
FIG. 9A illustrates a reference pattern.

FIG. 9A illustrates an example of a reference pattern for focusing the measuring device for measurement. The reference pattern 900 may be patterned on metal, plastic or paper. The reference pattern 900 may also be patterned directly on the surface 104 of the object 116 to be measured. The reference pattern may be, for example, printed or pressed onto the surface of the desired object and the size of the reference pattern 900 may vary according to the purpose. The reference pattern is placed in the desired measuring direction on the surface 104 of the object 116 to be measured. The direction and place may be determined and measured with the desired accuracy. When one or more reference patterns 900 have been placed on the object 116 to be measured, the detector 100 may be focused on the object 116 to be measured by means of the reference pattern 900.

The reference pattern 900 may comprise patterns with a changing width in the cross direction of detection. Instead of or in addition to the width, the changing parameter may be intensity or colour, for instance. The images may be equilateral, isosceles or rectangular triangles or other patterns. At the ends of the reference pattern 900, there may be a triangle whose apex is in the middle of the reference pattern 900. The height h of the triangle at the end may be the same as the width I of the other triangles in the middle of the reference pattern 900. The triangles may be separated from each other in optical measurement with different gray scales or colours.

Figure 9B:
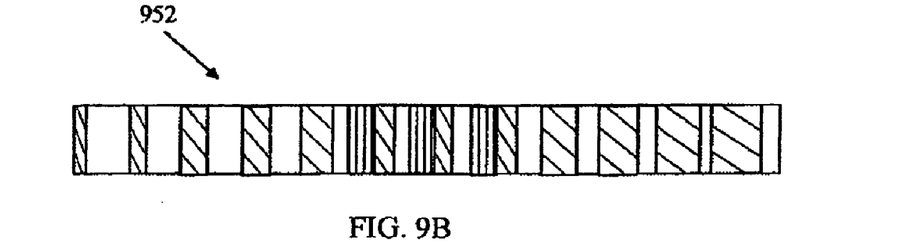
FIG. 9B illustrates a compiled image of the reference pattern after the detector has been rotated with respect to the reference pattern.

FIG. 9B illustrates a compiled image 952 of the reference pattern 900 detected by the detector 100 in a situation where the row detector 902 of the detector 100 has been rotated with respect to the reference pattern 900. The compiled image is also called a response matrix. Since the reference pattern 900 comprises changing patterns, their widths in the compiled image depend on where the detecting area intersects each pattern. Thus it can easily be seen from FIG. 9B that the row detector 102 is not parallel with the reference pattern 900. The deviation angle may also be deduced, and thus it is easy to rotate the detector 100 into a position where the row detector 102 is parallel with the reference pattern 900.

Figure 9C:
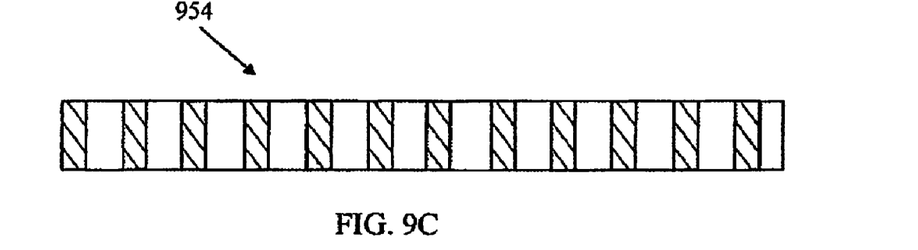
FIG. 9C illustrates a compiled image of the reference pattern after the detector has moved parallel with the reference pattern.
Figure 9D:
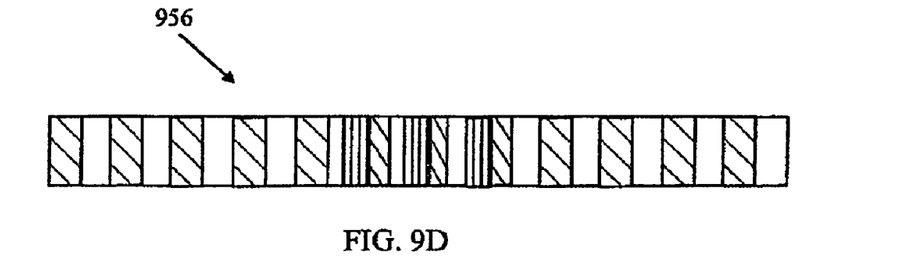
FIG. 9D illustrates a desired compiled image of the reference pattern.

FIG. 9C illustrates a compiled image 954 of the reference pattern 900 detected by the detector 100 in a situation where the detector has 100 moved in parallel with the reference pattern 900. In that case, some patterns (white ones) are wider than other patterns (lined ones). The end patterns are such that the compiled image produced by each end pattern has the maximum width on the middle axis of the reference pattern. Similarly, the end patterns in image 954 of the reference pattern 900 are narrower than the other patterns. This situation can be corrected by moving the detector 100 in parallel. After successful corrections, the detector 100 may detect a compiled image 956 according to FIG. 9D where all patterns have the same width, the total length of the compiled pattern being at its maximum and the compiled patterns produced by the ends having their maximum width. In the reference pattern, the end patterns are such that they are observed as pattern apexes. Thus it is easy to arrange the reference pattern in accordance with the primary direction of movement of the surface to be measured.

The reference pattern 900 may also include three smaller circular patterns 960 to 964, for example, by means of which the detector 100 may be focused on the reference pattern 900 roughly but quickly because the circle 960 to 964 widths change in the image to be produced on the detector 102 according to different alignment deviations.

The measuring device may also be focused for measuring without a reference pattern 900. This may be described in respect of one detector as follows, but the description also applies to two detectors. By means of an evenly moving surface, a maximum may be searched for the angular coefficient of one or more curves detected in the response matrix by rotating the detector about the optical axis. After this, the detector may be tilted in the primary direction of movement of the surface to be measured so that the angular coefficients of the curve or curves detected at the beginning of a detector row are the same. Both in the case of zero velocity and moving surface, alignment may be performed visually, supported by calculations, or completely automatically.

Figure 10A:
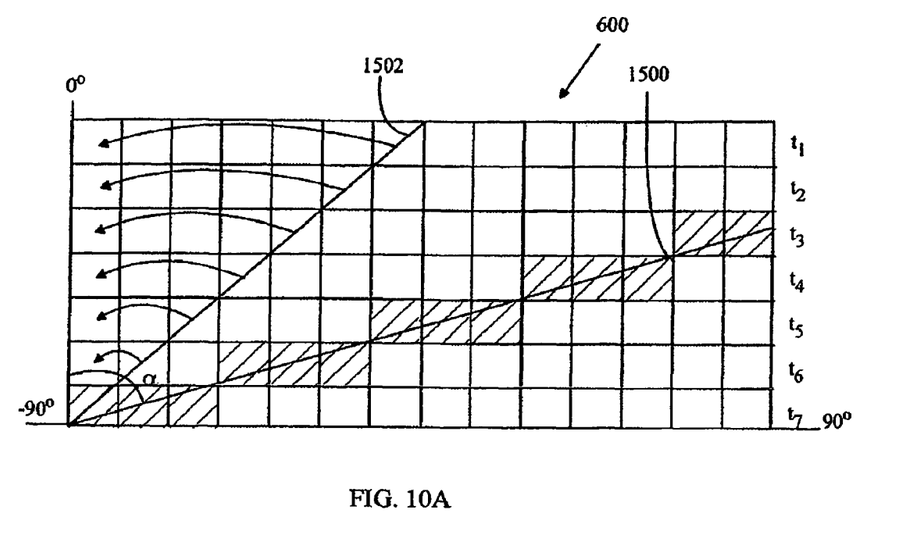
FIG. 10A illustrates a response matrix comprising a line at a steep angle.

FIG. 10A illustrates a situation where line 1500 caused by a quick phenomenon compared to the operating velocity of the detector 100 is observed in the response matrix 600. For this reason, the line 1500 is at a (very) steep angle $\alpha$. If the angle $\alpha$ is larger than 70°, for example, it is difficult to measure the velocity of the object to be measured accurately. The angle $\alpha$ of the line 1500 may be decreased by performing row transfers. Rows may be transferred, for example, so that the transfer reduces the angle by 45°, which is denoted by line 1502. The row transfer may be performed by transferring each row so that in each row, the pixel intersected by the line 1502 moves to the left edge of the matrix. At the same time, other pixels in the row move correspondingly.

Figure 10B:
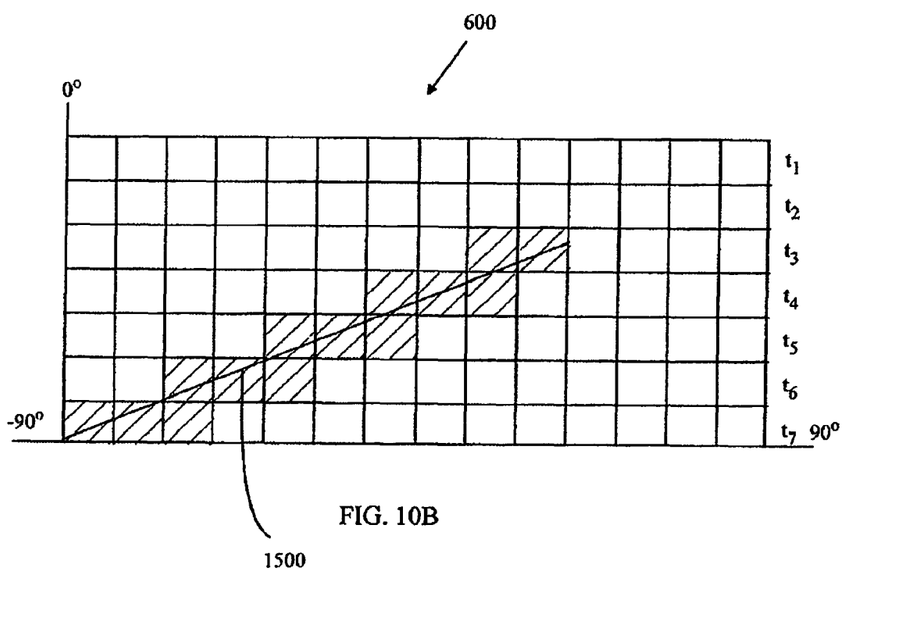
FIG. 10B illustrates a response matrix on which row transfer has been performed.

FIG. 10B illustrates a response matrix on which row transfer has been performed. The ascending angle of the line 1500 has decreased, which facilitates and focuses the measuring of the object to be measured. A corresponding transfer away from the 0 axis may be performed to facilitate and focus signal processing in a situation where a line caused by a slow phenomenon compared to the operating velocity of the detector is observed in the response matrix.

By performing several successive row transfers and by determining the movement of the object to be measured in connection with each transfer, three transfers, for example, may yield three possibly different results on the movement of the object to be measured. These results may be averaged and, since each includes random errors independent of one another, a more accurate result is obtained for the movement of the object to be measured than by any of the individual results. In fact, the result improves in proportion to the square root of the measurement results. For example, by three row transfers the measurement inaccuracy can be improved by coefficient $1/\sqrt{3}$.

Figure 11:
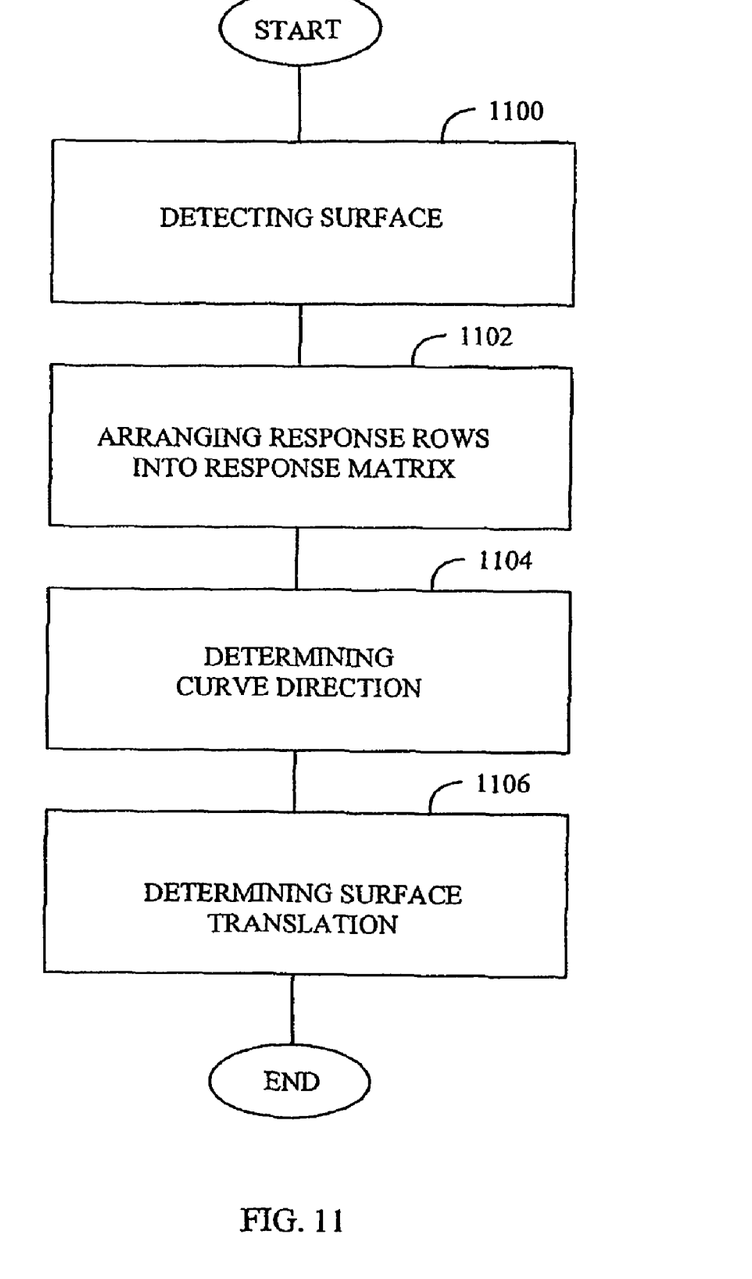
FIG. 11 illustrates a flow chart of the method.

FIG. 11 illustrates a flow chart according to the method. In the method, the surface 104 movement has at least one primary direction of movement. In step 1100, the surface is detected repeatedly by a detector row of at least one detector, the direction of the detector row being the same as the surface's primary direction of movement, and the distance between the surface and the detector is detected simultaneously to produce enlargement data and response rows. In step 1102, successive response rows are arranged into a response matrix. In step 1104, the direction of at least one curve in each response matrix is determined. In step 1106, the surface translation is determined in response matrices formed by means of the direction or directions of at least one curve or curve portion on the basis of enlargement data.

The method illustrated in FIG. 11 can be implemented as a solution based on a logic circuit or as a computer program. A computer program may be provided on a computer program distribution medium for its distribution. The computer program distribution medium is readable by a data processing device and it encodes computer program commands for measuring surface translation.

The distribution medium may be a prior art solution for distributing a computer program, such as a medium readable by a data processing device, a program storage medium, a memory readable by a data processing device, a program distribution package readable by a data processing device, a signal readable by a data processing device, a telecommunications signal readable by a data processing device or a compressed software package readable by a data processing device.

In addition to the above, the present solution may also be applied in recognizing vehicle movement status and position. In that case, it may function as part of a vehicle stabilizer system. The vehicle may be, for example, an industrial power tool which may move automatically without a driver or which is controlled by a driver.

Even though the invention has been described above with reference to examples according to the accompanying drawings, it is clear that the invention is not restricted thereto but it can be modified in various ways within the scope of the appended claims.

The invention claimed is:

1. A method of measuring translation of a surface, the method comprising:
   the movement of the surface of an object to be measured having at least one primary direction of movement,
   detecting the surface repeatedly by at least one detector row of at least one detector, the direction of the detector row being the same as the surface's primary direction of movement;
   arranging, by a signal processing unit, successive response rows into a response matrix;
   determining, by a signal processing unit, the direction or directions of at least one curve or curve portion in each response matrix; and
   determining, by a signal processing unit, enlargement data from a known distance between the surface and the detector to produce enlargement data and response rows and the surface translation in the response matrices by comparing the direction or directions of at least one curve or curve portion in a response matrix formed by telecentric optics with the direction or directions of at least one curve or curve portion in a response matrix formed by non-telecentric optics on the basis of the enlargement data.

2. The method according to claim 1, further comprising determining the surface translation by comparing the direction or directions of at least one curve or curve portion at least at two different moments.

3. The method according to claim 1, further comprising measuring the size of an image of an object on the surface to be measured by at least two detectors and determining the distance and/or distance variation of the surface to be measured from the image sizes.

4. The measuring device according to claim 1, further comprising detecting a distance between the surface and the detector to produce the enlargement data and the response rows.

5. A method of measuring translation of a surface, the method comprising:
- the movement of the surface of an object to be measured having at least one primary direction of movement,
- detecting the surface repeatedly by at least one detector row of at least one detector, the direction of the detector row being the same as the surface's primary direction of movement;
- arranging, by a signal processing unit, successive response rows into a response matrix;
- determining, by a signal processing unit, the direction or directions of at least one curve or curve portion in each response matrix; and
- determining, by a signal processing unit, enlargement data from a known distance between the surface and the detector to produce enlargement data and response rows, and the surface translation as zero velocity on the basis of the direction or directions of at least one curve or curve portion in the response matrices and on the basis of the enlargement data, and measuring the translation at the surface plane by means of a deviation exceeding a predetermined threshold value of a curve or curve portion in the response matrix.

6. The method according to claim 5, further comprising determining the translation by comparing directions of different curves.

7. The method according to claim 5, further comprising measuring a change in the distance between the surface and the detector row or movement by means of the enlargement.

8. The method according to claim 5, further comprising measuring inclination between the surface and the detector row by means of the surface translation.

9. The method according to claim 5, further comprising measuring a surface profile by means of the surface translation.

10. A method of measuring translation of a surface, the method comprising:
- the movement of the surface of an object to be measured having at least one primary direction of movement,
- detecting the surface repeatedly by at least one detector row of at least one detector, the direction of the detector row being the same as the surface's primary direction of movement;
- arranging, by a signal processing unit, successive response rows into a response matrix;
- determining, by a signal processing unit, the direction or directions of at least one curve or curve portion in each response matrix; and
- determining, by a signal processing unit, enlargement data from a known distance between the surface and the detector to produce enlargement data and response rows, and the surface translation on the basis of the direction or directions of at least one curve or curve portion and on the basis of the enlargement data, and determining the surface velocity by a correlation measurement between response signals of at least two detector elements.

11. A method of measuring translation of a surface, the method comprising:
- the movement of the surface of an object to be measured having at least one primary direction of movement,
- detecting the surface repeatedly by at least one detector row of at least one detector, the direction of the detector row being the same as the surface's primary direction of movement;
- arranging, by a signal processing unit, successive response rows into a response matrix;
- determining, by a signal processing unit, the direction or directions of at least one curve or curve portion in each response matrix; and
- determining, by a signal processing unit, enlargement data from a known distance between the surface and the detector to produce enlargement data and response rows, and the surface translation on the basis of the direction or directions of at least one curve or curve portion and on the basis of the enlargement data, and determining the velocity of the object to be measured by the direction or directions of at least one curve or curve portion and detecting the edge of the object to be measured by a change in the velocity.

12. A measuring device for measuring translation of a surface, wherein the measuring device comprises
- at least one detector row of at least one detector; and
- a signal processing unit,
- wherein, for forming response rows, each detector row is arranged to repeatedly detect the surface of the object to be measured, the surface having at least one primary direction of movement, and the direction of each detector row is set to be the same as the surface's primary direction of movement,
- wherein the at least one detector row is arranged to form at least two response matrices, of which at least one is formed by telecentric imaging optics and at least one by non-telecentric imaging optics,
- wherein the signal processing unit is arranged to receive distance information for determining enlargement data and the response rows formed by each detector row, form a response matrix related to each detector row from the successive response rows, and determine the direction or directions of at least one curve or curve portion in each response matrix, and
- wherein the signal processing unit is arranged to determine the surface translation on the basis of comparison of the direction or directions of at least one curve or curve portion in a response matrix formed by telecentric optics with the direction or directions of at least one curve or curve portion in a response matrix formed by non-telecentric optics, and on the basis of the enlargement data.

13. The measuring device according to claim 12, wherein the signal processing unit is arranged to determine the surface translation by comparing the direction of one curve at least at two different moments.

14. The measuring device according to claim 12, wherein a distance detector is arranged to measure a distance between the surface and the detector for determining the enlargement data.

15. A measuring device for measuring translation of a surface, wherein the measuring device comprises
- at least one detector row of at least one detector, and
- a signal processing unit,
- wherein, for forming response rows, each detector row is arranged to repeatedly detect the surface of the object to be measured, the surface having at least one primary direction of movement, and the direction of each detector row is set to be the same as the surface's primary direction of movement,
- wherein the signal processing unit is arranged to receive distance information for determining enlargement data and the response rows formed by each detector row, form a response matrix related to each detector row from the successive response rows, and determine the direction or directions of at least one curve or curve portion in each response matrix, and wherein the signal processing unit is arranged to determine the surface translation on the basis of the direction or directions of at least one curve or curve portion in the response matrices and on the basis of the enlargement data, and measure the surface translation as zero velocity by measuring the translation at the surface plane by means of a deviation exceeding a predetermined threshold value of a curve or curve portion in the response matrix.

16. The measuring device according to claim 15, wherein the signal processing unit is arranged to determine the translation by comparing the directions of different curves.

17. The measuring device according to claim 15, wherein the signal processing unit is arranged to measure a change in the distance between the surface and the detector row or movement by means of the enlargement.

18. The measuring device according to claim 15, wherein the signal processing unit is arranged to measure inclination between the surface and the detector row by means of the surface translation.

19. The measuring device according to claim 15, wherein the signal processing unit is arranged to measure a surface profile by means of the surface translation.

20. A measuring device for measuring translation of a surface, wherein the measuring device comprises
- at least two detectors each including at least one detector row; and
- a signal processing unit,
- wherein, for forming response rows, each detector row is arranged to repeatedly detect the surface of the object to be measured, the surface having at least one primary direction of movement, and the direction of each detector row is set to be the same as the surface's primary direction of movement,
- wherein the signal processing unit is arranged to receive distance information for determining enlargement data and the response rows formed by each detector row, form a response matrix related to each detector row from the successive response rows, and determine the direction or directions of at least one curve or curve portion in each response matrix, and
- wherein the signal processing unit is arranged to determine the surface translation on the basis of the direction or directions of at least one curve or curve portion in the response matrices and on the basis of the enlargement data, and determine the surface velocity by means of a correlation measurement between the response signals of at least two detector elements.

21. The measuring device according to claim 20, wherein the signal processing unit is arranged to measure the size of an image of an object on the surface to be measured by at least two detectors and determining the distance and/or distance variation of the surface to be measured from the image sizes.

22. A measuring device for measuring translation of a surface, wherein the measuring device comprises
- at least one detector including at least one detector row; and
- a signal processing unit,
- wherein, for forming response rows, each detector row is arranged to repeatedly detect the surface of the object to be measured, the surface having at least one primary direction of movement, and the direction of each detector row is set to be the same as the surface's primary direction of movement,
- wherein the signal processing unit is arranged to receive distance information for determining enlargement data and the response rows formed by each detector row, form a response matrix related to each detector row from the successive response rows, and determine the direction or directions of at least one curve or curve portion in each response matrix, and
- wherein the signal processing unit is arranged to determine the surface translation on the basis of the direction or directions of at least one curve or curve portion in the response matrices and on the basis of the enlargement data, determine the velocity of the object to be measured by the direction or directions of at least one curve or curve portion and detect the edge of the object to be measured by a change in the velocity.

* * * * *